(12) United States Patent
Weatherspoon et al.

(10) Patent No.: US 7,174,564 B1
(45) Date of Patent: Feb. 6, 2007

(54) SECURE WIRELESS LOCAL AREA NETWORK

(75) Inventors: Sultan Weatherspoon, Vancouver, WA (US); Duncan Glendinning, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/389,437

(22) Filed: Sep. 3, 1999

(51) Int. Cl.
*H04L 9/32* (2006.01)

(52) U.S. Cl. .............................. 726/2; 726/3; 709/225
(58) Field of Classification Search ........ 380/247–250; 713/170–174, 185–186, 201; 709/223, 225, 709/227–229; 455/410–411, 3, 425; 370/908–911, 370/352–359, 328–329; 726/2, 3, 11
See application file for complete search history.

(56) References Cited

U.S. PATENT DOCUMENTS

| | | | | |
|---|---|---|---|---|
| 5,282,250 | A | * | 1/1994 | Dent et al. ................... 380/247 |
| 5,325,419 | A | * | 6/1994 | Connolly et al. ......... 455/435.1 |
| 5,390,245 | A | * | 2/1995 | Dent et al. ................... 380/247 |
| 5,559,886 | A | * | 9/1996 | Dent et al. ................... 380/247 |
| 5,654,959 | A | * | 8/1997 | Baker et al. ................. 370/331 |
| 5,661,806 | A | * | 8/1997 | Nevoux et al. ................ 380/25 |

(Continued)

FOREIGN PATENT DOCUMENTS

WO  WO 99/01969  1/1999

OTHER PUBLICATIONS

Microsoft Press, Computer Dictionary, 1994, second edition, p. 363.*

(Continued)

*Primary Examiner*—Kim Vu
*Assistant Examiner*—Thomas Gyorfi
(74) *Attorney, Agent, or Firm*—Marger Johnson & McCollom PC (57) ABSTRACT

The secure wireless local area network of the present invention includes a single wired network that supports both wired and wireless devices. The network addresses security concerns by including an authentication server that services a plurality of access points. Each access point includes a first authentication device that generates and transmits a first authentication message to the corresponding wireless device over an air channel. The first authentication message includes encrypted validating information about the access point including an access point key that uniquely identifies the access point. Each wireless device includes a second authentication device. The wireless device receives the first authentication message and determines whether the access point is authorized to connect to the wired network. If the access point is valid, the second authentication device responds to the first authentication message by generating and transmitting a second authentication message to the access point. The second authentication message includes encrypted validating information about the wireless device and operator, e.g., a device key and the operator's logon name and password. The access point determines the authenticity of the wireless device by decrypting the portion of the second authentication message that includes the device key. If the wireless device is valid, the AP opens a control channel with the authentication server. The AP transmits the first and second authentication messages to the authentication server. If the authentication server validates the access point and the operator's logon name and password, it will authorize access to the wired network.

6 Claims, 5 Drawing Sheets

U.S. PATENT DOCUMENTS

| | | | | |
|---|---|---|---|---|
| 6,151,628 A * | 11/2000 | Xu et al. | ..................... | 709/225 |
| 6,272,129 B1 * | 8/2001 | Dynarski et al. | ........... | 370/356 |
| 6,307,837 B1 * | 10/2001 | Ichikawa et al. | ........... | 370/230 |
| 6,334,056 B1 * | 12/2001 | Holmes et al. | ............. | 455/445 |
| 6,466,571 B1 * | 10/2002 | Dynarski et al. | ........... | 370/352 |
| 6,600,734 B1 * | 7/2003 | Gernert et al. | .............. | 370/352 |
| 5,737,318 A * | 4/1998 | Melnik | ....................... | 370/254 |
| 6,075,860 A * | 6/2000 | Ketcham | .................... | 380/25 |
| 6,088,337 A * | 7/2000 | Eastmond et al. | .......... | 370/280 |

OTHER PUBLICATIONS

Hunt, Craig and Thompson, Robert Bruce. Windows NT TCP/IP Network Administration. O'Reilly & Associates, Inc.□□© Oct. 1998. [Chapter 12 ].*

Chen, Ling-Sheng. "Apply Personal Mobility in PCS Environment for Universal Personal Communications". Universal Personal Communications, 1996. Record., 1996 5th IEEE International Conference pp. 503-507.*

Internet Engineering Task Force (IETF) Request for Comment (RFC) 2138 article entitled "Remote Authentication Dial In User Service (RADIUS)", printed from website located at http://www.ietf.org/rfc/rfc2138.txt?number=2138, on May 24, 2001; pp. 1-61.

Korba, Larry. "Security System for Wireless Local Area Networks" ©1998 IEEE.*

Ashar Aziz and Whtifield Diffie; "A Secure Communications Protocol to Prevent Unauthorized Access-*Privacy and Authentication for Wireless Local Area Networks*";IEEE Personal Communications; First Quarter 1994; pp. 25-31.

V. Bharghavan; "*Secure Wireless LANs*"; Nov. 1994; pp. 10-17.

* cited by examiner

SECURE WIRELESS LOCAL AREA NETWORK

BACKGROUND OF THE INVENTION

1. Field of the Invention

This invention relates to a wireless local area network and, more particularly, to a secure wireless local area network.

2. Description of the Prior Art

A wireless local area network (LAN) is a flexible data communications system implemented as an extension to or as an alternative for a wired LAN. Using radio frequency (RF) technology, wireless LANs transmit and receive data over the air, minimizing the need for wired connections. Thus, wireless LANs combine data connectivity with operator mobility.

Wireless LANs have gained strong popularity in a number of vertical markets, including the health-care industry, retail, manufacture, warehousing, and academia. These industries have profited from the productivity gains of using hand-held terminals, personal digital assistants (PDAs), notebook computers, and the like to transmit real-time information to centralized hosts for processing. Today, wireless LANs are becoming more widely recognized as a general-purpose connectivity alternative for a broad range of business customers. With wireless LANs, operators can access shared information without looking for a place to plug in. Wireless LANs offer a variety of productivity, convenience, and cost advantages over traditional wired networks including mobility, installation speed, simplicity, and flexibility, reduced cost of ownership, and scalability. Wireless LANs frequently augment rather than replace wired LAN networks—often providing the final few meters of connectivity between a wired network and the mobile operator.

Wireless LANs use electromagnetic airwaves (radio or infrared) to communicate information from one point to another without relying on any physical connection. Radio waves are often referred to as radio carriers because they simply perform the function of delivering energy to a remote receiver. The data being transmitted is superimposed on the radio carrier so that it can be accurately extracted at the receiving end. This is generally referred to as modulation of the carrier by the information being transmitted. Once data is superimposed (modulated) onto the radio carrier, the radio signal occupies more than a single frequency since the frequency or bit rate of the modulating information adds to the carrier. To extract data, a radio receiver tunes in one radio frequency while rejecting all other frequencies.

Figure 1:
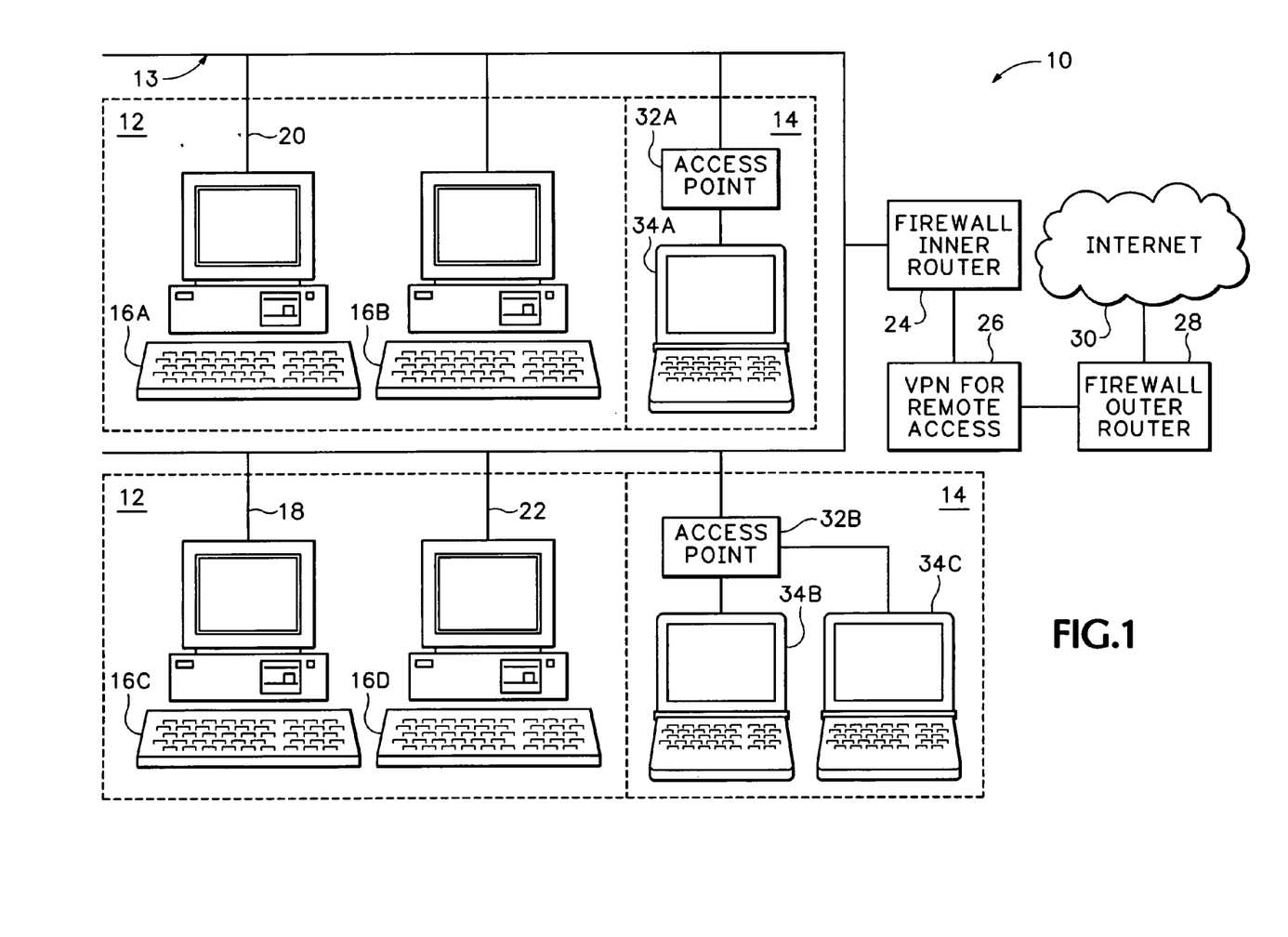
FIG. 1 is a block diagram of a conventional network.

FIG. 1 is a block diagram of a conventional network 10 including a wired LAN 12 and a wireless LAN 14. The wired LAN 12 is often set up as an Intranet. An Intranet is a network designed for information processing within a company or organization. An Intranet is so called because it usually employs Web pages for information dissemination and applications associated with the Internet, such as Web browsers. It can also include file transfer protocol (FTP) sites, e-mail, and newsgroups and mailing lists accessible only to those within the organization.

A typical wired LAN 12 includes a plurality of wired devices 16A–D, e.g., desktop personal computers (PCs), connected to the same or different sub-networks (subnets), e.g., 18, 20, and 22 terminating at a router (not shown). The wired devices 16A–D are physically connected to each other through cabling (not shown) on the wired LAN 12. For example, PCs 16A and 16B are connected to subnet 18 while PCs 16C and 16D are connected to subnet 20. Subnets 18 and 20 are coupled to each other and to inner firewall router 24 via subnet 22. The inner and outer firewall routers 24 and 28 provide an authorization mechanism that assures only specified operators or applications can gain access to the wired LAN 12. The inner firewall router 24 links the wired LAN 12 to remote users seeking access through the wireless LAN 14 and the Internet 30. The outer firewall 28 limits access to the Virtual Private Network (VPN) server 26 by remote users seeking access through the Internet 30.

A typical wireless LAN 14 includes at least one access point (AP), the physical cabling (not shown) that connects one AP to another, and at least one wireless device, like devices 34A–C. Common examples of wireless devices 34A–C are hand-held terminals, PDAs, notebook computers, and the like. Other wired and wireless devices are well known to those of skill in the art. An AP, like APs 32A–B, is a transmitter/receiver (transceiver) device that connects to the wireless LAN 14 from a fixed location. At a minimum, the AP receives, buffers, and transmits data between the wireless devices 34A–C and the wireless LAN 14 through an air communications channel. A single AP can support a single wireless device—e.g., AP 32A supports wireless device 34A—or a small group of wireless devices—e.g., AP 32B supports wireless devices 34B and 34C—. The APs can function within a range of less than one hundred to several hundred feet. The AP includes an antenna that is usually mounted high but may be mounted essentially anywhere that is practical so long as the desired radio coverage is obtained.

The inner firewall router 24 is coupled to the VPN tunnel server 26 and the outer firewall router 28. The VPN server 26 encrypts messages to and from the wired LAN 12 and may provide secondary authentication for remote users. The VPN server 26 uses the Internet 30 to economically connect remote users such as those in branch offices and remote project teams to the wired LAN 12. The VPN server 26 also acts as a gateway between operators of the wireless LAN 14 and the wired LAN 12. The VPN server 26 views access to the wired LAN 12 by the operators of the wireless devices 34A–C the same as remote access by remote users. Thus, a wireless device operator only has access to other wireless devices on the wireless LAN 14 but does not have automatic access to the Internet 30 or any of the wired devices 16A–D on the wired LAN 12.

To maximize security and prevent unauthorized access to the wired LAN 12 from a rogue wireless device or AP, the wireless LAN 14 is isolated from the wired LAN 12. Put differently, the cabling that physically connects one wired device to another on the wired LAN 12 is different from the cabling 36 that connects one AP to another on the wireless LAN 14. Isolating the wireless LAN 14 from the wired LAN 12 prevents a wireless device from accessing a wired LAN 12 unless authorized to do so by the VPN server 26 and the inner firewall router 24. However, isolating the wireless LAN 14 from the wired LAN 12 is costly and labor intensive. Moreover, routing the wireless and other remote user traffic through the single VPN server 26 slows access for both, particularly if large files are being transferred. As the VPN server 26 and the firewalls 24 and 28 are busy checking or re-routing data communications packets, they do not flow through the network 10 as efficiently as they would if the VPN server 26 and the firewalls 24 and 28 were not in place. Additionally, if the VPN server 26 fails, wired network 12 access through the VPN server 26 is prevented for both wireless operators and remote users.

Another disadvantage to the network 10 is that security is not well integrated. In order for wireless device operators to access the wired LAN 12, the VPN server 26 must authenticate them. This requires the wireless operator to install authentication software (not shown) on the wireless device. The authentication software supported by the VPN server 26 may change or be upgraded requiring the operator to change or upgrade the authentication software installed on his wireless device before the VPN server 26 will authorize access to the wired LAN 12. The high error rate in this type of configuration results in an increased cost of ownership.

Accordingly, a need remains for a secure wireless local area network that is inexpensive, easy to set up, fast, and reliable.

SUMMARY OF THE INVENTION

The secure LAN of the present invention includes a wireless device for use by a wireless device operator. An access point is connected to a wired LAN in communication with the wireless device through an air channel for authenticating the wireless device. An authentication server is connected to the wired LAN for providing the operator with access to the wired LAN after authenticating the access point, the wireless device, and the operator.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT

Figure 2:
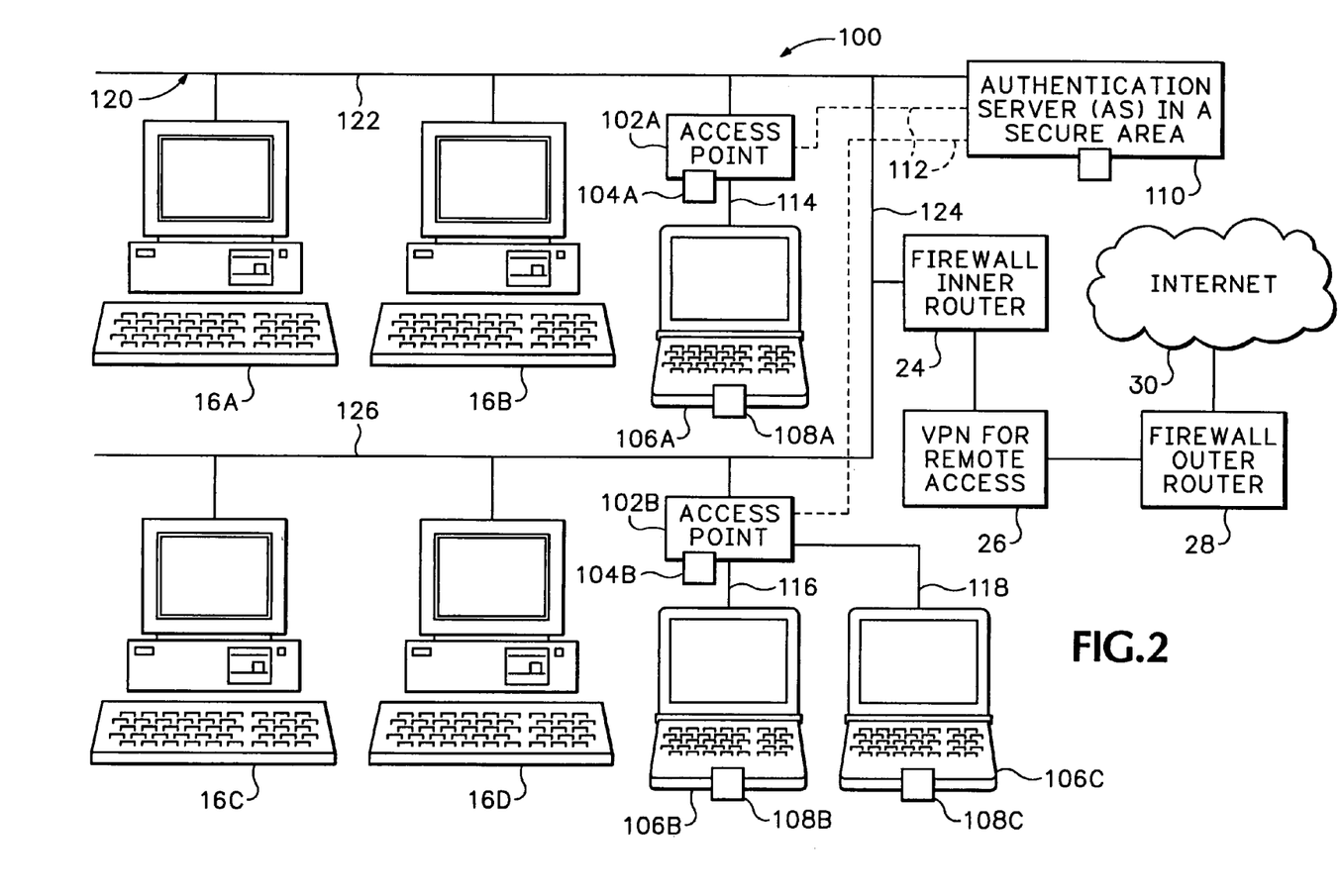
FIG. 2 is a block diagram of the network of the present invention.

Referring to FIG. 2, the network 100 of the present invention includes a plurality of wired devices 16A–D, e.g., PCs, connected to the same or different sub-networks (sub-nets) 122, 124, and 126 on the wired LAN 120 terminating at a router (not shown). The wired devices 16A–D are physically connected to each other through the wired LAN 120. The firewall inner and outer routers 24 and 28, respectively, serve the similar function as explained above with reference to FIG. 1. The VPN server 26 limits access to the wired LAN 120 to authorized remote users only.

A plurality of APs 102A–B is connected directly to the wired LAN 120 at fixed locations. As described earlier with reference to FIG. 1, an AP is a receiver/transmitter (transceiver) device that receives, buffers, and transmits data between a wireless device 106A–C and the wired LAN 120 through a corresponding air communications channel 114, 116, or 118, respectively. Data transmitted over the air channels 114, 116, or 118 is encrypted using a variety of encryption mechanisms including Digital Encryption Standard (DES) endorsed by the National Institute of Standards and Technology, Pretty Good Privacy (PGP), and the like. Encryption mechanisms such as those described above rely on keys or passwords. The longer the key, the more difficult the encryption is to break. The DES standard relies on a 56-bit key length. Some encryption mechanisms have keys that are hundreds of bits long. A single AP can support a single wireless device—e.g., AP 102A supports wireless device 106A—or a small group of wireless devices—e.g., AP 102B supports wireless devices 106B–C.

To offset security concerns, each AP 102A–B and each wireless device 106A–C includes a corresponding first and second authenticating devices 104A–B and 108A–C, respectively. The authenticating devices 104A–B and 108A–C are preferably tokens installed in the APs 102A–B and wireless devices 106A–C, respectively. Tokens identify a specific user. Smart cards are a type of token. Smart cards resemble the familiar, plain magnetic strip credit cards but are much more powerful and secure. Each smart card is embedded with an integrated microprocessor and non-volatile memory. Smart cards store information about the holder such as the holder's personal information—birth date, address, etc.—medical history, or bank account data. Security on smart cards is maintained through a combination of measures including personal identification numbers, passwords, secret keys, and encryption keys stored in the card e.g., session, public, and private encryption keys. An authentication server 110 is connected to the wired LAN 120. The authentication server 110 works in conjunction with the APs 102A–B and the wireless devices 106A–C and their respective authentication devices 104A–B and 108A–C to allow access only to those authorized by the network's administrators.

Figure 3A:
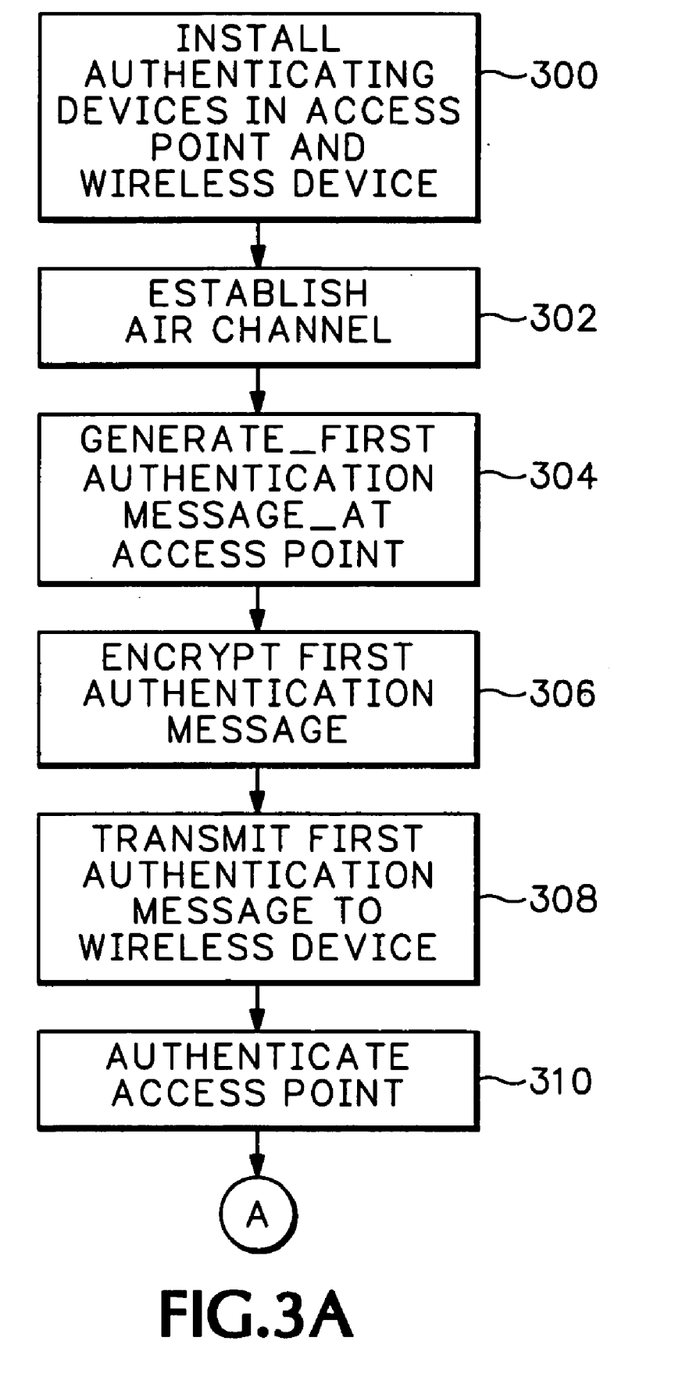
FIGS. 3A–C is a flow chart of the method for operating a network of the present invention.
Figure 3B:
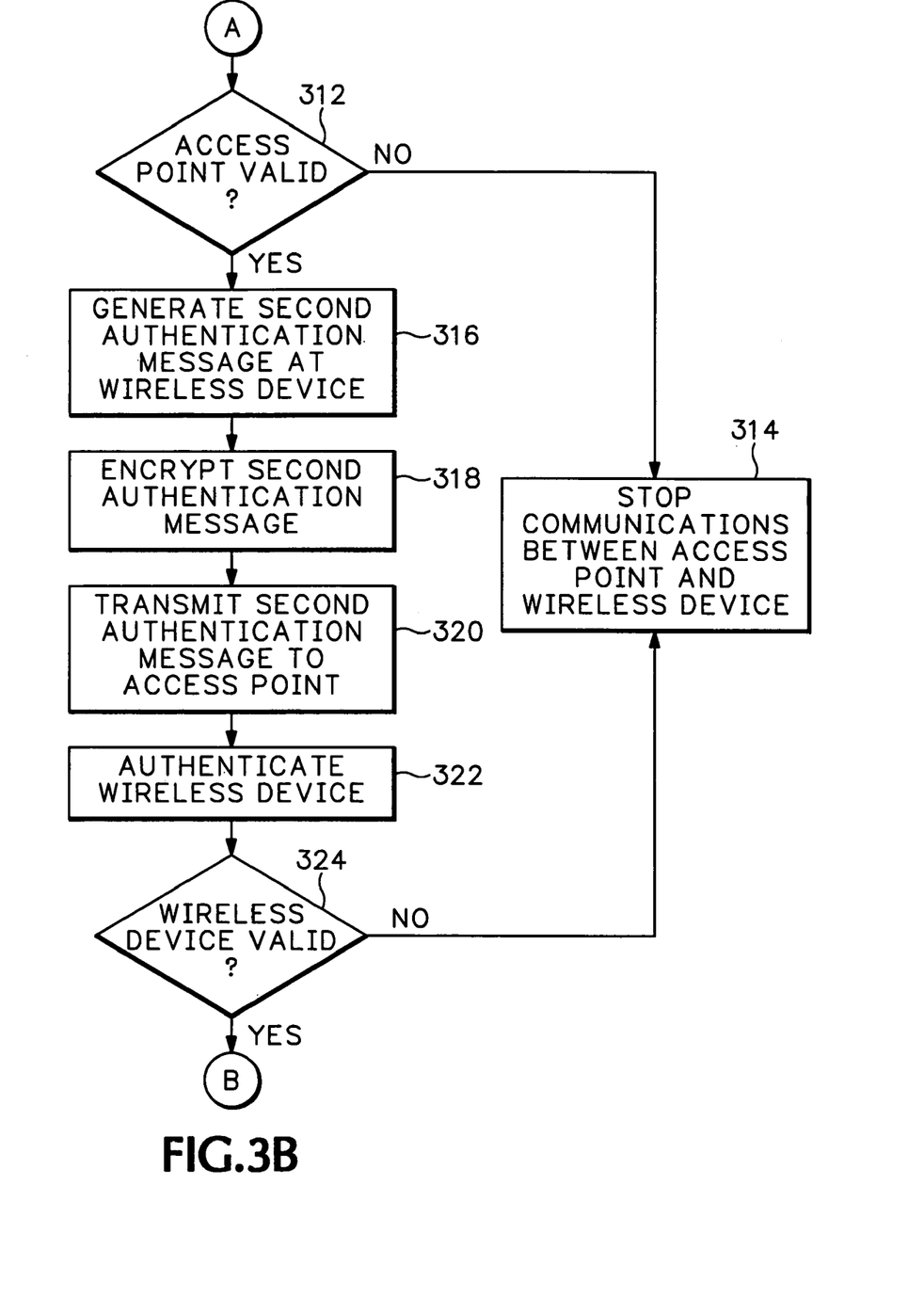
Figure 3C:
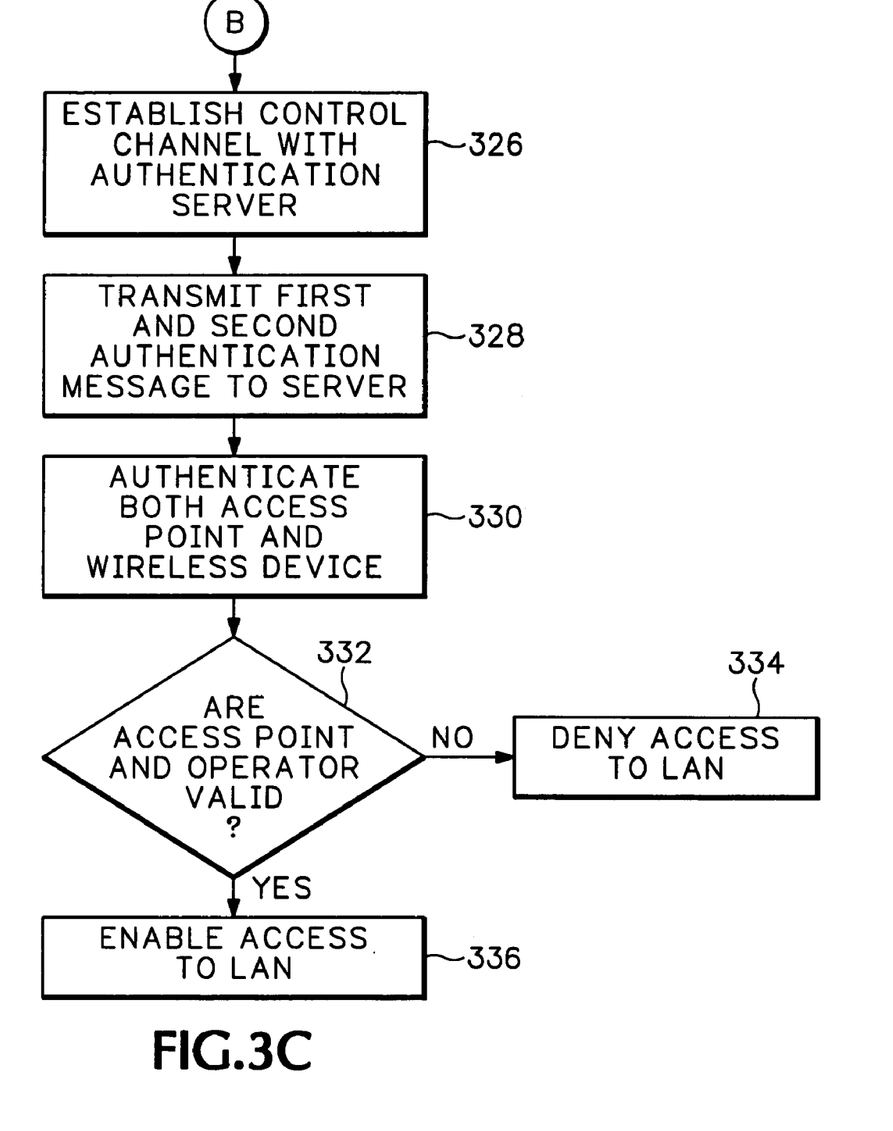

The network 100 operates as shown in FIGS. 3A–C. For simplicity, network operation will be described for a single AP 102A supporting a single wireless device 106A. However, a person having skill in the art should recognize that the network 100 can support a plurality of APs and corresponding wireless devices without departing from the principles of the present invention.

At step 300, the first and second authentication devices 104A and 108A, respectively, are installed in the AP 102A and in the wireless device 106A, respectively. An operator establishes an air communications channel 114 between the wireless device 106A and the AP 102A (step 302). During the establishment of the air channel 114, the AP 102A and the wireless device 106A exchange the encryption mechanism to be used in future communications. At step 304, the first authentication device 104A generates a first authentication message that includes validating information about the AP, e.g., an AP key unique to the AP 102A. The AP key may be a digital signature. A digital signature is a block of data at the end of a message that attests to the authenticity of the file and, consequently, of the AP 102A. If any change is made to the file, the signature will not verify. Thus, digital signatures perform both an authentication and message integrity function.

The AP encrypts (step 306) and transmits (step 308) the first authentication message to the wireless device 106A. The wireless device 106A receives and decrypts (step 310) the first authentication message and determines whether the AP is a valid access point to the wired LAN 120 (step 312). Authenticating the AP by analyzing the first authentication message ensures that the AP is authorized to be connected to the wired LAN 120 and that it is not a rogue AP set up to facilitate or gain unauthorized access to the wired LAN 120.

If the AP 102A is not valid, the air communications channel is disabled and communications between the AP 102A and the wireless device 106A terminate (step 314). If the AP 102A is valid, the second authentication device 108A generates (step 316) a second authentication message that, at a minimum, includes a device key identifying the second authentication device 108A as well as the operator's logon name and password. The device key may be known or unknown to the operator. Validation of the wireless device 106A may involve a challenge response in which the AP 102A requests a certain type of validation from the wireless device 106A, e.g., a digitally signed message. The second authentication device 108A encrypts (step 318) and transmits (step 320) the second authentication message to the AP 102A over the air channel 114. The AP 102A receives the second authentication message and decrypts the portion of the message that includes the device key. At step 322, the AP 102A analyzes the decrypted portion of the second authentication message, i.e., the device key, to determine whether the wireless device 106A is valid.

If the device key is invalid (step 324), the air communications channel is disabled and communications between the AP 102A and the wireless device 106A terminate (step 314). If the device key verifies (step 324), that is, if the wireless device 106A is valid, the AP 102A establishes a control channel 112 with the authentication server 110 at step 326. The AP 102A then transmits (step 328) the encrypted first authentication message and the encrypted portion of the second authentication message that includes the operator's logon name and password to the authentication server 110.

The authentication server 110 decrypts the first authentication message to verify that the AP 102A is valid (step 330). The authentication server then decrypts the second authentication message to verify the operator's logon name and password (step 330). The authentication server 110 verifies the operator's logon name and password by, e.g., comparing the received logon name and password to a stored list of authorized user names and passwords. If both or either of the AP 102A and the operator are invalid (step 332), the authentication server 110 will deny access to the wired LAN 120 (step 334). If the authentication server 110 validates both the AP and the operator (step 332), the authentication server 110 will enable access to the wired LAN 120 at step 336. The authentication server 110 will enable access to the wired LAN 120 by, e.g., establishing a data channel between the AP and any other device on the wired LAN 120. That is, the authenticated AP and operator will have access to all LAN 120 resources available to wired devices such as devices 16A–D.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

The invention claimed is:

1. A method for operating a local area network (LAN), comprising:
   requesting access to a wired LAN;
   generating a first authentication message including validating information about an access point directly connected to the wired LAN;
   transmitting the first authentication message from the access point to a wireless device over a wireless channel;
   validating the access point by analyzing the first authentication message without going through a firewall means responsive to the requesting;
   generating a second authentication message including validating information about the wireless device and a wireless device operator;
   transmitting the second authentication message from the wireless device to the access point;
   validating the wireless device by analyzing the second authentication message without going through the firewall means responsive to the requesting;
   transmitting the first and second authentication messages to an authentication server after validating the access point and the wireless device without going through the firewall means;
   validating the operator, the wireless device, and the access point without going through the firewall means responsive to the requesting; and
   enabling a data channel between the wireless device and other devices on the wired LAN after validating the operator, the wireless device, and the access point,
   where validating the access point, the wireless device, and the operator occurs at an authentication server.

2. The method of claim 1 where transmitting the first authentication message includes transmitting information about the access point contained in a first authentication device.

3. The method of claim 2 where transmitting the second authentication message includes transmitting information about the wireless device and the operator contained in a second authentication device.

4. The method of claim 1 where transmitting the first and second authentication messages includes establishing a control channel between the access point and the authentication server.

5. The method of claim 1 including encrypting information transferred over the wireless and control channel.

6. A secure local area network (LAN), comprising:
   a firewall directly connected to control access to wired LAN;
   a wireless device operated by a wireless device operator to generate a first authentication message including validating information about the wireless device and the wireless device operator;
   an access point directly connected to the wired LAN in communication with the wireless device through an air channel to authenticate the wireless device and the wireless device operator without going through the firewall by analyzing the first authentication message, to generate a second authentication message including validating information about the access point, and to transmit the second authentication message to the wireless device; and
   an authentication server coupled to the wired LAN to provide the wireless device operator with access to the wired LAN by authenticating the wireless device, the wireless device operator, and the access point without going through the firewall responsive to receiving the first and second authentication messages from the access point and responsive to a request from the wireless device and the wireless device operator to access the wired LAN;
   where the wireless device is constructed to validate the access point by analyzing the second authentication message.

* * * * *

UNITED STATES PATENT AND TRADEMARK OFFICE
CERTIFICATE OF CORRECTION

PATENT NO. : 7,174,564 B1 Page 1 of 1
APPLICATION NO. : 09/389437
DATED : February 6, 2007
INVENTOR(S) : Sultan Weatherspoon and Duncan Glendinning It is certified that error appears in the above-identified patent and that said Letters Patent is hereby corrected as shown below:

Signed and Sealed this

Twenty-fifth Day of December, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,174,564 B1 |
| APPLICATION NO. | : 09/389437 |
| DATED | : February 6, 2007 |
| INVENTOR(S) | : Sultan Weatherspoon and Duncan Glendinning |

It is certified that error appears in the above-identified patent and that said Letters Patent is hereby corrected as shown below:

Column 6, lines 32-33, the words "to wired LAN" should be replaced with --to a wired LAN--.

This certificate supersedes the Certificate of Correction issued December 25, 2007.

Signed and Sealed this

Seventh Day of April, 2009

JOHN DOLL
*Acting Director of the United States Patent and Trademark Office*